United States Patent
Denham et al.

(10) Patent No.: US 6,866,733 B1
(45) Date of Patent: Mar. 15, 2005

(54) METHOD OF FORMING A FLEXIBLE INSULATION BLANKET HAVING A CERAMIC MATRIX COMPOSITE OUTER LAYER

(75) Inventors: Jerry Denham, San Diego, CA (US); Robert A. Dichiara, Jr., Carlsbad, CA (US); Vann Heng, Buena Park, CA (US); Leanne L. Lehman, Laguna Niguel, CA (US); David Zorger, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 10/611,493

(22) Filed: Jul. 1, 2003

Related U.S. Application Data

(62) Division of application No. 10/291,929, filed on Nov. 11, 2002.

(51) Int. Cl.[7] .................... B32B 31/20; B32B 31/26
(52) U.S. Cl. ............ 156/89.11; 156/93; 244/1 R; 244/121
(58) Field of Search .................... 244/121, 1 R, 244/158 R; 156/89.11, 93

(56) References Cited

U.S. PATENT DOCUMENTS

| | | | | |
|---|---|---|---|---|
| 5,024,978 A | | 6/1991 | Allaire et al. | |
| 5,038,693 A | * | 8/1991 | Kourtides et al. | 112/440 |
| 5,514,474 A | * | 5/1996 | Morgan et al. | 428/375 |
| 5,626,951 A | * | 5/1997 | Hogenson | 442/262 |
| 5,804,306 A | | 9/1998 | Sorenson et al. | |
| 5,928,752 A | * | 7/1999 | Newquist | 428/74 |
| 5,990,025 A | | 11/1999 | Suyama et al. | |
| 6,007,026 A | * | 12/1999 | Shorey | 244/158 A |
| 6,479,104 B1 | * | 11/2002 | DiChiara et al. | 427/370 |
| 6,497,390 B1 | * | 12/2002 | Fischer et al. | 244/163 |
| 6,652,950 B2 | * | 11/2003 | Barney et al. | 428/102 |
| 2002/0189496 A1 | * | 12/2002 | Davis et al. | 106/287.18 |

OTHER PUBLICATIONS

Aerospace Engineering; Thermal Protection For Spacecraft (Magazine); Oct., 1999; pp. 27–29.

* cited by examiner

*Primary Examiner*—Melvin C. Mayes
(74) *Attorney, Agent, or Firm*—Alston & Bird LLP

(57) ABSTRACT

A flexible insulation blanket having a ceramic matrix composite (CMC) outer layer, and a method of producing a flexible insulation blanket having a smooth, aerodynamically suitable, outer surface by infiltrating ceramic material within the outer ceramic fabric layer of the flexible insulation blanket and curing the ceramic material to form a CMC layer. The CMC layer is cured while the blanket is under compression such that the resulting CMC layer has a smooth surface.

20 Claims, 4 Drawing Sheets

METHOD OF FORMING A FLEXIBLE INSULATION BLANKET HAVING A CERAMIC MATRIX COMPOSITE OUTER LAYER

CROSS-REFERENCE TO RELATED APPLICATIONS

This application is a divisional of U.S. application Ser. No. 10/291,929, filed Nov. 11, 2002, which is hereby incorporated herein in its entirety by reference.

FEDERALLY SPONSORED RESEARCH OR DEVELOPMENT

The United States Government may have rights in the inventions set forth herein as provided by the terms of Cooperative Agreement No. NCC2-9015 awarded by the National Aeronautics and Space Administration.

FIELD OF THE INVENTION

The invention relates to flexible reusable surface insulation blankets for use on the outer surface of reusable launch vehicles. More particularly, the invention relates to ceramic coatings and methods of coating the outer mold line surface of insulation blankets.

BACKGROUND OF THE INVENTION

Reusable launch vehicles (RLV's) such as the Space Shuttle Orbiter utilize reusable thermal protection systems (TPS's) for thermal protection during launch, orbit, and reentry into the atmosphere. The TPS must simultaneously perform as a radiator, a reflector, and an insulator in order to, respectively, emit heat from the surface of the vehicle, prevent on-orbit heating, and protect the structure of the vehicle from residual heat flux.

During a typical reentry, the outer surface of the Orbiter is subjected to heating in excess of 2300° F. The underlying structure of the Orbiter is primarily aluminum and graphite epoxy, and the TPS must protect the structure from any temperatures exceeding 350° F. Therefore, insulation used with the TPS must have extraordinarily low thermal conductivity while being able to withstand the physical rigors of space flight.

Most thermal insulation consists of reusable surface insulation tiles. The tile substrate materials and coating selections are dependent upon the mechanical and thermal requirements of the particular location on the vehicle. For example, tiles located on the upper surface of the forward fuselage experience much lower temperatures and require less strength then tiles on the nose of the vehicle. The tiles are typically low-density blocks of rigid ceramic fibers such as alumina or silica fibers and have a typical width and length of 6 inches by 6 inches.

Recently, it has become commonplace to use flexible blanket insulation, often called flexible insulation (FI), in place of ceramic tiles as a part of the TPS of RLV's. The flexible insulation is basically a layer of pliable alumina or other ceramic batting sandwiched between layers of ceramic fabric. The fabric layers and batting are sewn together with a ceramic thread to form a quilted insulation blanket. The outer portion of the blanket is coated with a ceramic slurry, which dries and forms a ceramic coating on the top fabric portion of the blanket. The typical ceramic matrix is known as a C-9™ coating, which consists of Ludox™ silica sol, available from W. R. Grace & Co., Columbia, Md., and a silicon carbide high emissivity agent. A blanket treated in such a manner can withstand multiuse temperatures of 1200° F. with a onetime use temperature of 1400° F. under static conditions.

The flexible insulation is favorable for use on RLV's because it is much easier to maintain and replace than individual insulation tiles. Large unitary pieces of flexible insulation blanket may be constructed to conform to the contours of a vehicle, which would have previously required hundreds of individually installed tiles for insulation. The flexible insulation is also able to withstand undulations and vibrations of the underlying vehicle better than the ceramic tiles, which are rigid and brittle and must be carefully spaced along an undulating vehicle surface to prevent the tiles from fracturing. Another advantage of blankets is that tile systems weigh more then blanket systems and must also have a strain isolation pad (SIP) along with insulation filler bars between tiles.

There are some drawbacks associated with the use of traditional flexible blankets. The flexible blankets have a somewhat rough, quilted upper fabric layer. The C-9™ coating used to coat most blankets is made of coarse SiC particles in a liquid silica sol medium. These coarse SiC particles do not penetrate into the fibers of the outer blanket cloth and therefore are captured on the surface of the coarse fibers. To be compatible with the C-9™ coating, the upper layer of fabric must use a coarse fabric weave. Further, because the outer layer of fabric and the batting are loosely quilted together, the outer layer of fabric does not provide a uniform substrate for forming a flat, smooth surface. For instance, during drying of the C-9™ coating, the upper fabric layer tends to buckle and to cure as a slightly irregular surface. Once cured, the coarse C-9™ coatings sometimes have a tendency to flake off of the blanket during use.

The rough and irregular surfaces of flexible insulation blankets have heretofore made them unsuitable for use on windward surfaces of vehicles or surfaces of vehicles which experience relatively high temperatures, such as the nose section and leading edges of the vehicle. When in use, the irregular surface of the blankets causes early tripping of the boundary layer as well as increased friction along the surface of the vehicle upon reentry, thereby generating large amounts of excessive heat. Therefore, flexible insulation blankets have only been used upon leeward surfaces of the RLV's which do not experience aero turbulence or high temperatures during reentry.

What is needed is a flexible insulation blanket having a smooth, uniform, durable, light weight, and thin protective ceramic layer and a method of producing such a blanket. Further, what is needed is a method of producing a flexible insulation blanket having a uniform ceramic layer without imparting unfavorable weight or insulative characteristics to the blanket.

SUMMARY OF THE INVENTION

The invention is a flexible insulation blanket having a ceramic matrix composite (CMC) outer layer, and a method of producing a flexible insulation blanket having a smooth, aerodynamically suitable, outer surface by infiltrating ceramic material within the outer ceramic fabric layer of the flexible insulation blanket and curing the ceramic material to form a CMC layer. The CMC layer is cured while the blanket is under compression such that the resulting CMC layer has a smooth surface.

The flexible insulation blanket is constructed of an outer layer of ceramic fabric, a layer of ceramic batting, and an inner layer of ceramic fabric, all sewn together in a quilt like pattern. A target amount of ceramic precursor slurry material is applied to the outer surface of the blanket. The ceramic material of the slurry is preferably a monazite material, and the monazite is preferably applied as an aqueous slurry.

One aspect of the invention is that the monazite is infiltrated within the outer fabric layer of the blanket without infiltrating the batting of the blanket. This is accomplished by applying the monazite slurry to the fabric in multiple stages such that only enough slurry is applied to the fabric layer at each stage to infiltrate the fabric layer, but not to permeate the underlying batting. To some extent, a portion of the slurry solvent evaporates after each stage, which increases the viscosity of the slurry such that it does not seep into the batting layer of the blanket.

Another aspect of the invention is that prior to curing of the pre-ceramic material, the outer surface of the blanket is positioned against a smoothly surfaced rigid plate so that the infiltrated outer fabric layer is maintained with a very smooth and even orientation while cured.

Because the pre-ceramic material of the insulation is cured while the outer surface of the blanket is held against the smoothly surfaced plate, the outer fabric layer does not buckle or bubble during curing. The pre-ceramic material within the outer layer cures within the ceramic fibers of the outer fabric layer to form a CMC layer. Pressure is then released and the resulting blanket insulation is fired at high temperature to sinter the ceramic materials.

The resulting insulation blanket has a smooth, tough, highly emissive CMC layer as its top layer that allows the invented blanket to be used on windward surfaces of a spacecraft. No pre-ceramic slurry enters the batting during processing, so the complete insulative efficiency of the batting is maintained.

Because the surface of the invented blanket is more smooth than previous blankets, the blanket may be used on windward surfaces of a vehicle without tripping the boundary layer. Because the boundary layer is not tripped during flight, the overall temperature to which the blanket is exposed is reduced.

In addition to the reduction in boundary layer interference, greater protection is provided by the monazite CMC layer because the ceramic material is infiltrated within the fibers of the fabric rather than simply coated onto the fibers as with previous C-9™ materials. Infiltration is allowed by application of slurries having smaller particles of ceramic material. Use of smaller ceramic particles within the slurry also allows the use of smooth fibers within the outer fabric layer rather than the coarse fibers required with the use of previous slurries. Further, the monazite ceramic matrix composite layer of the invented blanket provides greater thermal protection than previous ceramic coatings such as C-9™ material.

It is desirable to use the invented flexible blankets on windward surfaces of spacecraft rather than ceramic tiles because blankets can be put on in large sizes such as 36 inches by 36 inches, compared to 6 inches by 6 inches for tiles, due to their inherent flexibility and built in strain isolation. This reduces assembly, part count and operation maintenance. The large, smooth blankets also reduce the steps and gaps typically found between the 6 inch by 6 inch tiles.

BRIEF DESCRIPTION OF THE DRAWINGS

Figure 1:
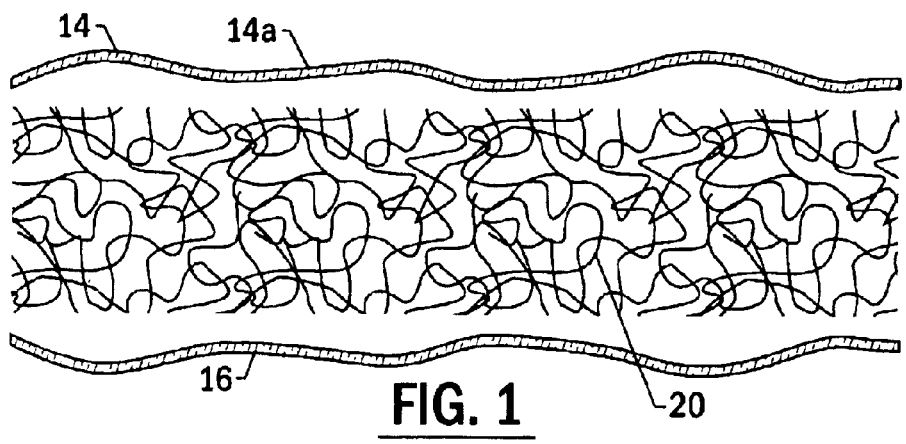
Figure 2:
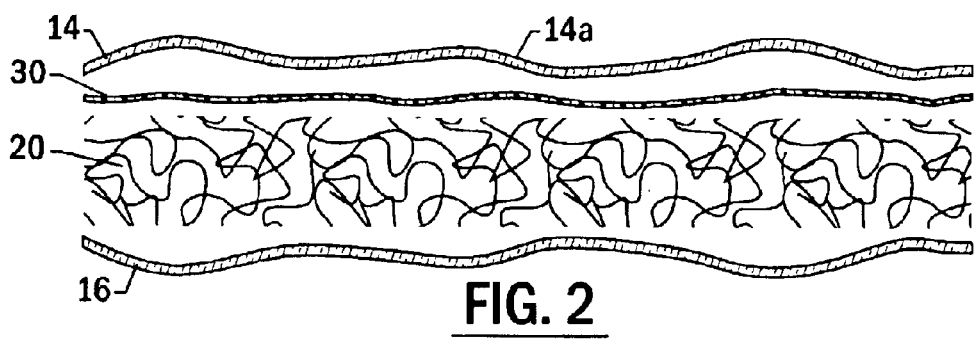
Figure 3:
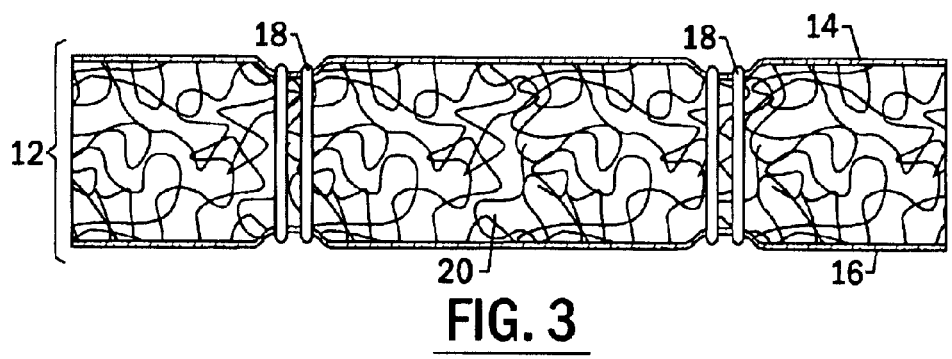
Figure 4:
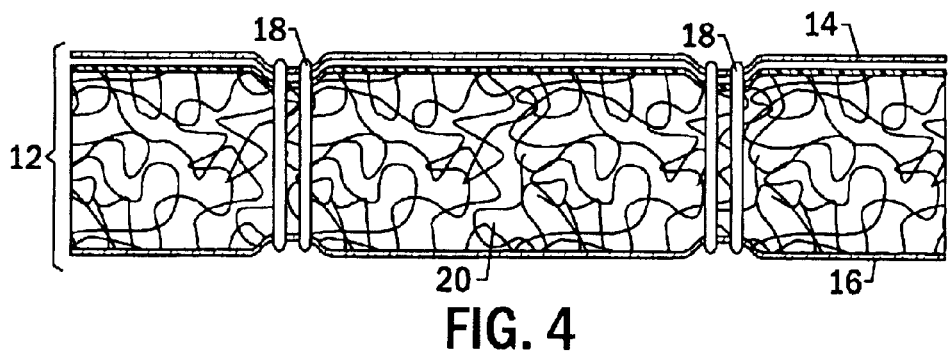
Figure 5:
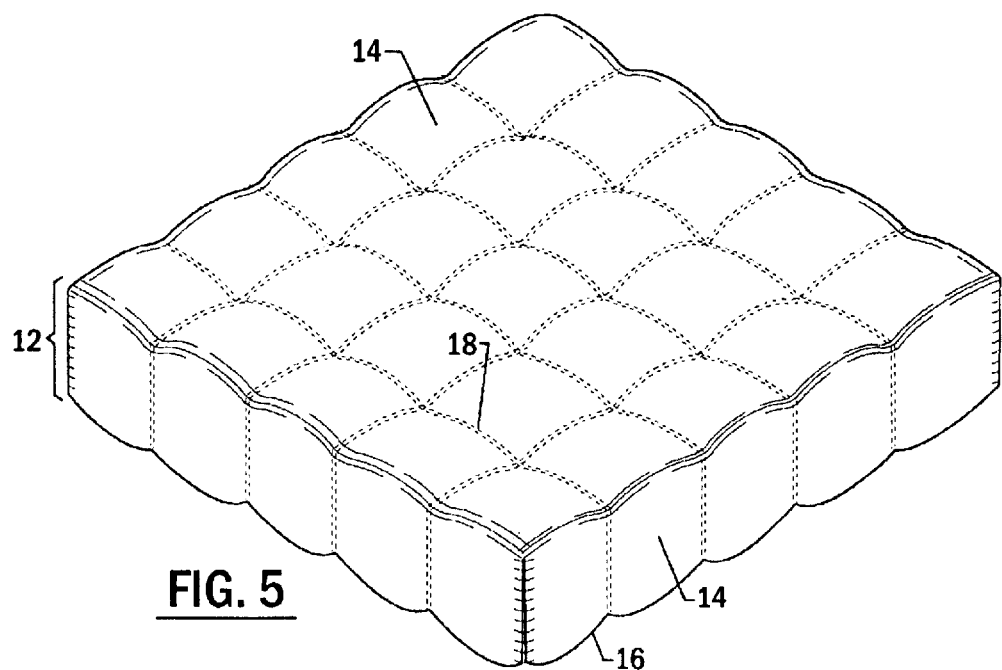
Figure 6:
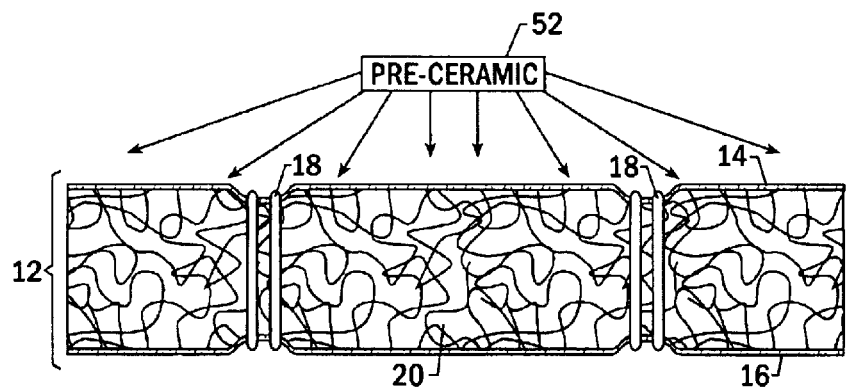
Figure 7:
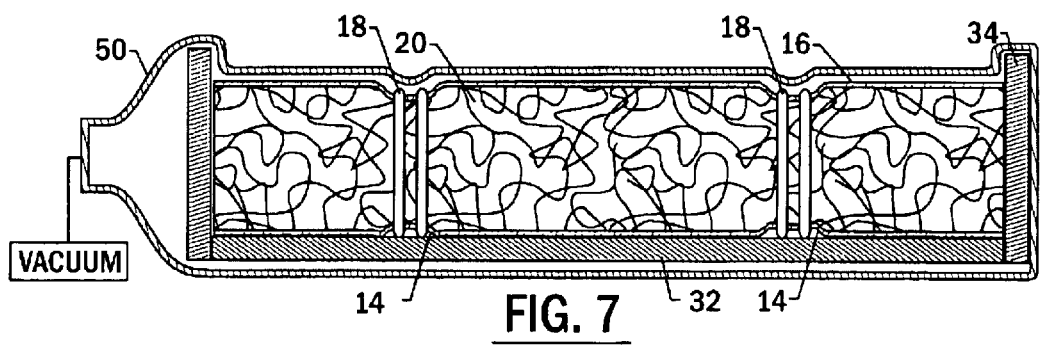
Figure 8:
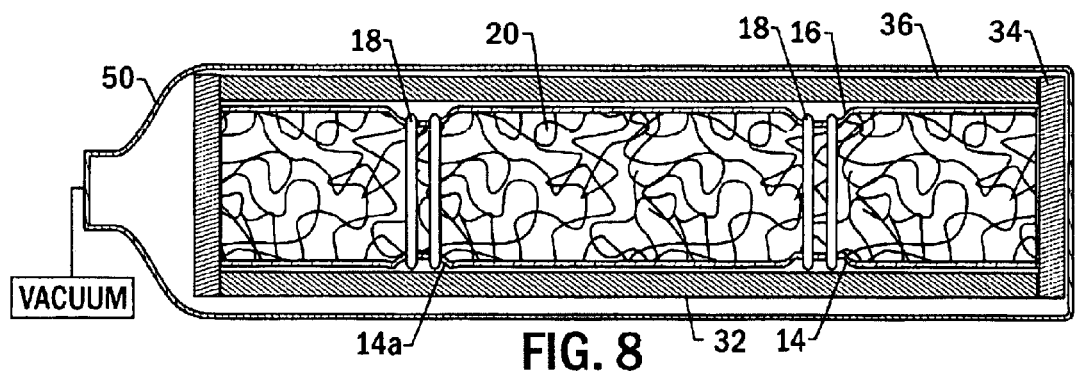
Figure 9:
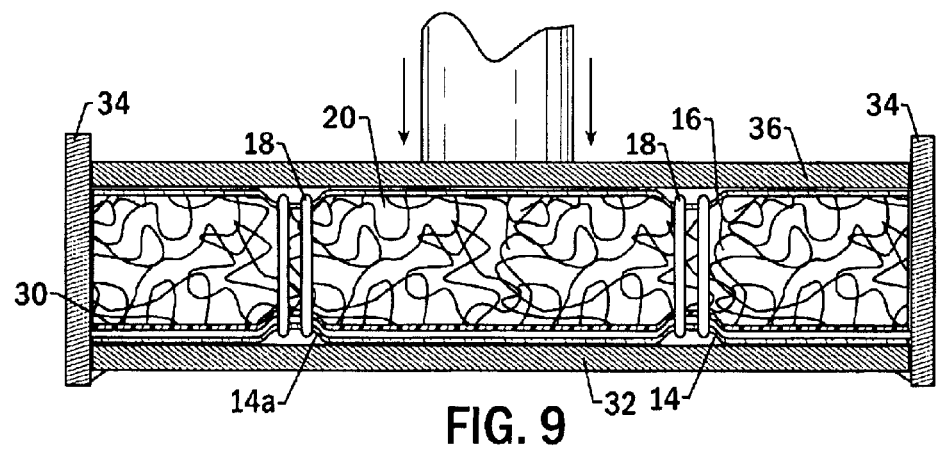
Figure 10:
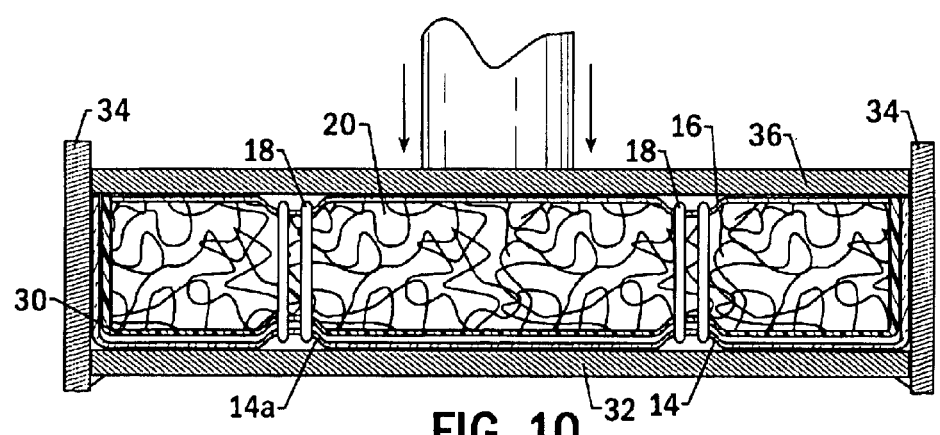
Figure 11:
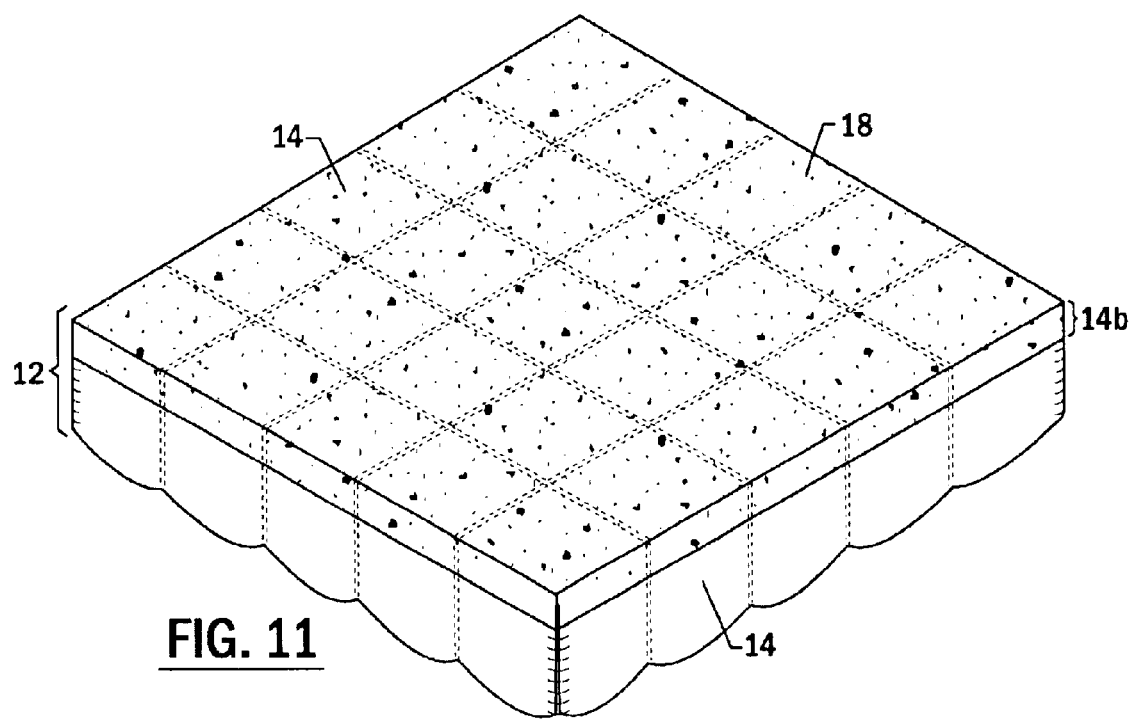

Having thus described the invention in general terms, reference will now be made to the accompanying drawings, which are not necessarily drawn to scale, and wherein:

FIG. 1 is a cross-sectional view of the components of an embodiment of the invented blanket showing their relationship to one another;

FIG. 2 is a cross-sectional view of the components of another embodiment of the invented blanket showing their relationship to one another, FIG. 3 is a cross-sectional view of the components of an embodiment of the invented blanket shown quilted together, FIG. 4 is a cross-sectional view of the components of another embodiment of the invented blanket shown quilted together;

FIG. 5 is a perspective view of an embodiment of this invention prior to application of pre-ceramic material;

FIG. 6 is a cross-sectional view of an embodiment of this invention showing the application of a pre-ceramic slurry;

FIG. 7 is a cross-sectional view of an embodiment of the invented blanket being held in compression;

FIG. 8 is a cross-sectional view of an alternative embodiment of the invented blanket being held in compression;

FIG. 9 is a cross-sectional view of a second alternative embodiment of the invented blanket being held in compression;

FIG. 10 is a cross-sectional view of a second embodiment of the invented blanket being held in compression with edges of the outer fabric layer overlapping the sides of the blanket; and FIG. 11 is a perspective view of an embodiment of this invention having a CMC upper layer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, the CMC coated flexible insulation blanket of the invention is constructed of various layers of material. It is anticipated that the invented insulation will be most often used to insulate the outer surface of a spacecraft such as the Space Shuttle though the insulation is not limited to such use. For purposes of this description, "outer" or "Outer Mold Line (OML)" components are those components, which are disposed at a greater distance from the spacecraft than are corresponding "inner" components of the insulation. Likewise, "outer" surfaces of components tend to face outwardly away from the vehicle while "inner" or "Inner Mold Line (IML)" surfaces face the vehicle.

The outer layer 14 of fabric material is woven from ceramic fibers and serves as an outer surface of the insulation as well as a substrate for the CMC matrix. A layer 20 of pliable ceramic fiber batting is placed between the layer 16 of fabric material woven from ceramic fibers, which serves as the inner surface of the insulation blanket.

The outer fabric layer 14 is a woven layer of ceramic fibers. The layer 14 preferably has a thickness of between about 0.01 and 0.06 inches, and most preferably about 0.03 inches. The fibers of the fabric are ceramic and remain physically stable when exposed to extreme temperatures, such as those experienced by a spacecraft upon re-entry into the atmosphere. For use on leeward surfaces of spacecraft, the fibers must be stable to 1200° F., and for windward surfaces the fibers must be stable up to 2400° F. The fibers are continuous, meaning that most of the fibers span a substantial portion of either the length or width of the woven fabric. Exemplary fabrics for use with the invented blanket on the outer mold line (OML) are quartz woven fabrics, Nextel™ fabrics, mullite fabrics, and silicon carbide fabrics. Of the Nextel™ fabrics, Nextel™ 610 (alumina), Nextel™ 720 (mullite), and Nextel™ 440 (aluminoborosilicate) fabrics are preferred, with Nextel™ 440 being particularly preferred due to its lower cost. The 3-ply angle interlock is the preferred weave due to its durability, though weaves such as #500 Satin, #800 Satin, and plain weaves may be used.

The outer fabric layer 14 is preferably a single layer of material, though the layer may have more than one ply. The outer layer 14 is preferably 1 to 3 plies in thickness, with each ply generally being between about 0.01 and 0.06 inches in thickness. Preferably a single layer of 3-ply angle interlock fabric yields about 0.030 inches of thickness. Use of a thicker weave or larger number of plies allows for a greater thickness of CMC material within the outer layer 14 of the insulation blanket and thus allows for a stronger, more protective surface. However, thicker weaves or multiple plies of ceramic fabric increase the overall weight of the blanket and also reduce the flexibility of the blanket because of the large amount of semi-rigid ceramic matrix material within the multi-ply outer layer 14.

Referring to FIG. 2, it is optional to position a resin film 30 between the outer fabric layer 14 and the batting layer 20. The resin layer 30 is used to assist in preventing pre-ceramic slurry material from reaching the batting material when the pre-ceramic slurry is applied to the outer layer. During curing of the CMC layer, the resin film 30 is simply volatilized and allowed to escape the blanket. The resin film 30 is a thin, flexible film which is non-porous to pre-ceramic slurry and which is resistant to organic components which may be found in the pre-ceramic slurry discussed later in this description. If the pre-ceramic slurry material is monazite in water, the film layer 30 may be selected from a wide range of organic resins, such as nylon.

The batting layer 20 is a loosely entangled agglomeration of non-woven fibers or slightly needled through the thickness of the batting layer. The batting of ceramic fibers act as the primary insulating material within the blanket. The batting material is most typically alumina. Other common ceramic batting materials include various combinations of alumina, silica (amorphous or quartz), alumina borosilicate, mullite, and zirconia fibers.

The inner fabric layer 16 is a woven layer of ceramic fibers. The layer 16 preferably has a thickness of between about 0.01 and 0.06 inches, and most preferably about 0.01 inches. The fibers of the fabric are ceramic and remain physically stable when exposed to extreme temperatures. However, the fabric of the inner layer 16 need not be as heat resistant as the fabric of the outer layer 14 because the inner layer 16 is protected by the insulative batting 20. The fibers of the inner layer 14 are continuous. Exemplary fabrics for use as the inner layer are quartz woven fabrics, Nextel™ fabrics such as Nextel™ 440, and fiberglass fabrics such as S-glass or E-glass. $S_2$-glass is the preferred fiber.

Referring to FIGS. 3 and 4, once assembled, the outer layer 14, batting 20, and inner layer 16 are loosely sewn together using ceramic thread 18. The layers are sewn at about 1 inch intervals to form a blanket 12 with an undulating quilt like pattern. The edges of the blanket 12 may be left open for later alteration, or the outer layer 14 and film 30, if any, may be folded downwards to overlap the sides of the blanket and sewn into position, as shown in FIG. 5.

By way of example, a blanket 12 which may be used with this invention is Advanced Flexible Reusable Surface Insulation (AFRSI) which is comprised of quartz fiber batting 20 that is sandwiched between high temperature woven quartz fiber outer fabric layer 14 and a lower temperature glass fiber inner layer 16. The components are stitched together using quartz and glass threads 18 in one inch square patterns. The size of such blankets is up to 36 inches by 36 inches, and the thickness is from 0.20 inches up to 3 inches. Such blankets have been used on portions of the upper surface of the Space Shuttle and are available from Boeing, High-Temp Inc. and Oceaneering Thermal Systems, Seattle, Wash.

A pre-ceramic slurry is formed from a water-based monazite suspension. Beta or alpha, preferably beta, silicon carbide is optionally added to the suspension as a high emissivity agent to lower the surface temperature of the blanket when in use, by absorbing and reradiating the heat to space. The pre-ceramic slurry is a suspension of 15–45 wt % solids, preferably about 30 wt %, in DI water. The solids are composed of 60–100 wt %, preferably about 90 wt %, monazite particulates, and 0–40 wt %, preferably about 10 wt %, SiC particulates. Other emissivity agents can readily be substituted for SiC in the formulation. A method such as ball milling may be used to combine and mix the components of the pre-ceramic slurry.

Referring to FIG. 6, the outer layer of fabric 14 is infiltrated with the pre-ceramic slurry 52. The fabric 14 may be infiltrated with the slurry in any number of ways, including but not limited to, applying the slurry to the fabric by brushing, spraying, or sponging. If a multi-ply fabric is used within the outer layer 14, then the pre-ceramic slurry is preferably infiltrated through each of the plies.

The pre-ceramic slurry infiltrates the outer layer 14 with a targeted amount of slurry from 0.10–2.0 g/in$^2$, preferably 0.80 g/in$^2$ for a single layer of 3-ply angle interlock fabric. The slurry is applied in increments that allow the solvent to soak into the outer fabric, thus increasing the viscosity of the suspension and thereby only penetrating within the outer fabric layer rather than the batting. Little to no absorption occurs by the batting 20 or inner layer 16 of the blanket 12. In this manner, the slurry is isolated within the fabric material of the outer layer 14 so that an effective ceramic matrix composite material may be formed from the ceramic materials of the slurry and the ceramic fiber substrate of the outer layer 14.

In an alternative embodiment, a monazite suspension is first infiltrated into the fabric without the SiC, thereby minimizing any interaction of the SiC with the fiber, and cured. The second application of monazite with the SiC emissivity agent is applied to the blanket surface.

Referring to FIG. 7, the outer surface 14a of the outer layer 14 is contacted with a smoothly surfaced plate 32 and the blanket 12 is compressed and held under compression against the smoothly surfaced plate 32. An exemplary compression method is to place the blanket and plate 32 in a vacuum bag 50 and applying a vacuum of about 10–12 inches of Mercury. The compression of the blanket 12 against the smooth surface causes the outer layer 14 to be maintained flush against the smoothly surfaced plate 32.

A release agent coating or film such as Teflon™ or Armalon™ films, preferably Teflon™, is applied to the outer surface 14a of the outer layer 14 so that the smooth plate 32 may be contacted with the outer surface 14a without adhering to the outer layer 14 which has been in filtrated with the pre-ceramic material.

According to another alternative embodiment, shown in FIG. 8, the outer surface 14a of the outer layer 14 is pressed against a smoothly surfaced plate 32, a second plate 36 is positioned against the inner fabric layer 36 of the blanket 12, and the blanket is compressed while the outer layer 14 is held against the smoothly surfaced plate 32. As with the single plate method, the blanket may be compressed with a vacuum bag 50. Alternatively, as shown in FIG. 9, the blanket 12 may be compressed between conventional mechanical pressing apparatus which applies force transverse to the two plates 32, 36. An exemplary compression force is 5 to 10 psi.

In one embodiment of the invention, shown as FIG. 10, the blanket 12 is placed in a frame. The frame has a flat plate surface 32 and sidewalls 34 which contain the blanket 12 within the confines of the frame. The flat surface 32 of the frame supports the outer layer 14 and holds the outer layer 14 in a smooth, planar orientation. The frame keeps the sides of the blanket 12 square to the surface, producing sharp corners and edges on the top of the blanket as the blanket is compressed. Producing the blanket such that the corners have sharp corners and edges assures a tight fit from one blanket to the next when installed upon a vehicle. A tight fit is important in reducing interruption of proper air flow across the surfaces of the blankets when in use.

While the blanket 12 with the outer layer impregnated with the pre-ceramic material is maintained under compression, the temperature of the blanket 12 is raised to the curing temperature of the pre-ceramic paste. The curing temperature for the preferred monazite pre-ceramic used herein is from about 100° F. to about 350° F., and is most typically about 200° F./2 hours then 350° F./2 hours with a heating rate of 18° F./minute. Curing of the ceramic material causes the ceramic within the outer layer 14 of the blanket to solidify and converts the infiltrated outer layer 14 of the blanket into a ceramic matrix composite (CMC) layer 14 comprising a layer of ceramic fabric embedded within a matrix of ceramic material.

By supporting the outer layer 14 upon a smooth surface during the curing of the ceramic material within the outer fabric layer 14, a resultant flexible insulation blanket 12 having a smooth CMC layer 14 may be achieved. The entire blanket 12, including the CMC material is somewhat flexible after curing, so the CMC layered insulation may later be shaped to fit the curvature of a particular area of a vehicle.

Shaped blankets may be produced by using non-flat surfaces such as a curved plate 32 as long as the plate 32 that is in contact with the outer layer 14 has a smooth surface and uniform compression is provided over the surface area of the blanket 12. The shaped blankets are preferred for application to curved surfaces of a vehicle. If the blankets are cured and sintered while compressed against a plate having the shape of the surface to which the blanket will be applied, the curved blanket does not have to be flexed for application to the curved surface.

After curing of the pre-ceramic material, the CMC layered blanket 12 is removed from the applicable compression apparatus and allowed to decompress. The CMC layer 14, which was cured while pressed against a flat surface, retains its flat orientation after it is allowed to decompress. The batting 20 within the blanket 12 remains uninfiltrated throughout the process. Once compression is released, the batting 20 expands and returns the blanket to its original dimensions.

Referring to FIG. 11, after being allowed to decompress, the blanket 12 has a very flat CMC upper layer 14. The blanket is preferably coated in such a manner that the CMC layer extends along the sides of the blanket, from the upper surface of the blanket approximately one quarter the depth of the blanket 14b. This side coating protects the blanket at the contact point where it is placed against other blankets when installed upon a vehicle.

Finally, the ceramic matrix outer layer of the insulation 14 is sintered at a temperature of between about 1800° F. to about 2400° F., preferably about 2200° F. from about 15 minutes to 5 hours, and preferably for about 1 hour. This sintering step sinters the ceramic matrix around and within the fibers of the outer layer, at the same time minimizing the amount of bonding of the matrix to the fiber which provides a toughened non-brittle CMC surface. The sintering step is carried out using a radiant heat set up to fire the CMC surface 14 of the blanket without heating the entire blanket 12 to the sintering temperature, since the entire blanket cannot withstand the 2200° F. sintering temperature, particularly the inner fabric layer 16, which is constructed of material such as S2 glass. Such sintering may be accomplished by radiantly heating the CMC layer 14 while monitoring the inner layer 16 temperature to make sure that it does not exceed the maximum stable temperature for the material of the inner layer.

If a resin film layer 30 has been used within the blanket, the high temperature experienced during sintering effectively disintegrates the resin film 30 within the blanket 12. The organic structure of the film 30 breaks down and the film is volatilized from the blanket.

The resulting CMC layered flexible insulation blanket 12 has a pliable CMC layer 14 integrated with a high temperature flexible insulation blanket. Because of the manner in which the CMC layer 14 is produced and integrated with the blanket 12, the CMC layer 14 has a very smooth surface quality. The smooth surface quality of the CMC layer allows the invented insulation to be used on regions of spacecraft that were previously limited to rigid ceramic tile installations. The smooth surface prevents tripping of the boundary layer, which is critical to prevent excessive heating as well as reducing heating caused by friction and air resistance, thus allowing the invented insulation to be used on higher temperature portions of the spacecraft than previous flexible insulation blankets.

The monazite CMC layer has higher temperature capabilities than previous C-9™ coatings or CMC materials. The monazite composite surface has a multiuse temperature of 2200° F. with a onetime use temperature of 2400° F. This is because monazite resists bonding to the fibers causing decoupling between the fibers and the matrix, which results in the CMC not becoming brittle.

By infiltrating the matrix material directly into the outer fabric layer of the blanket rather than adding supplemental layers of fabric or secondary layers of CMC material, the overall weight of the blanket is reduced. At the same time, by preventing the ceramic matrix material from forming within the batting of the blanket, the formation of an unnecessarily thick or non-uniform CMC layer is prevented and the full insulating capacity of the batting is maintained.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing a flexible insulation blanket having a ceramic matrix composite infiltrated layer with a smooth surface, said method comprising:

layering, respectively, an outer ceramic fabric layer, a batting layer, and a inner ceramic fabric layer;

quilting said layers to form a flexible insulation blanket;

infiltrating said outer fabric layer of said blanket with a monazite based pre-ceramic slurry;

compressing the blanket in the direction of thickness of the blanket by applying pressure to said outer layer of the blanket with a smoothly surfaced plate;

curing said pre-ceramic slurry; and sintering the infiltrated outer ceramic layer to form a ceramic matrix composite layer.

2. The method of claim 1, wherein the outer ceramic fabric layer is comprised of multiple plies of fabric.

3. The method of claim 1, wherein the outer ceramic fabric layer is selected from aluminoborosilicate, alumina, and mullite.

4. The method of claim 3, wherein the outer ceramic fabric layer is woven from an aluminoborosilicate fiber.

5. The method of claim 1, wherein the outer ceramic fabric layer has a thickness of about 0.01 inches to 0.06 inches.

6. The method of claim 1, wherein the batting is composed of ceramic selected from alumina, silica, mullite, zirconia, or a combination thereof.

7. The method of claim 1, wherein the inner ceramic fiber layer is woven from fibers selected from aluminoborosilicate, alumina, and mullite, S-glass, and E-glass.

8. The method of claim 1, wherein the pre-ceramic slurry is infiltrated within the outer fabric layer of the blanket by soaking the fabric within the slurry.

9. The method of claim 1, wherein the pre-ceramic slurry is infiltrated within the outer fabric layer of the blanket by applying the slurry by brushing, spraying, or sponging.

10. The method of claim 1, wherein the pre-ceramic slurry is a suspension of

15–45% solids, and the remainder water, wherein the solids are composed of 60–100% monazite particulates and 0–40% SiC particulates.

11. The method of claim 1, wherein said slurry has a ceramic component and a solvent component, and wherein the method further comprises the step of allowing the solvent component of the pre-ceramic slurry to evaporate, resulting in a slurry with a paste-like consistency, prior to compression of the blanket.

12. The method of claim 1, further comprising the step of applying a releasing agent to the outer surface of the infiltrated fabric layer prior to compressing the blanket.

13. The method of claim 1, wherein the step of curing the pre-ceramic slurry occurs between about 300° F. and about 500° F.

14. The method of claim 13, wherein the step of curing occurs at about 350° F.

15. The method of claim 1, wherein the step of sintering the ceramic matrix occurs at between about 1800° F. and 2400° F. for a time period of about 15 minutes to 5 hours.

16. The method of claim 15, wherein the step of sintering occurs at a temperature about 2200° F. for about 1 hour.

17. The method of claim 1, further comprising the step of turning the edges of the fabric layer toward the inner surface of the blanket such that the edges of the outer fabric layer cover at least a portion of the edge of the blanket.

18. The method of claim 1, further comprising releasing said compression between said curing and sintering steps.

19. The method of claim 1, wherein the step of sintering the infiltrated outer ceramic layer is accomplished using radiant heat directed mainly at the surface of the outer layer of the blanket.

20. A method of constructing a ceramic matrix composite (CMC) infiltrated flexible insulation blanket having a smooth surface, comprising:

laminating an outer ceramic fabric layer, a batting layer, and a inner ceramic fabric layer;

sewing the laminate to form a quilted blanket having an outer surface corresponding to the outer fabric layer and an inner surface corresponding to the inner fabric layer;

applying an uncured monazite based ceramic matrix material to the outer surface of the blanket;

placing the blanket under pressure in the direction of thickness of the blanket;

curing said ceramic matrix material to form a CMC layer with the outer fabric layer of the blanket;

releasing said pressure; and sintering the CMC layer of the blanket.

* * * * *